Sept. 8, 1936.  A. LANGSNER  2,053,837
STADIA INSTRUMENT
Filed May 14, 1934  3 Sheets-Sheet 1
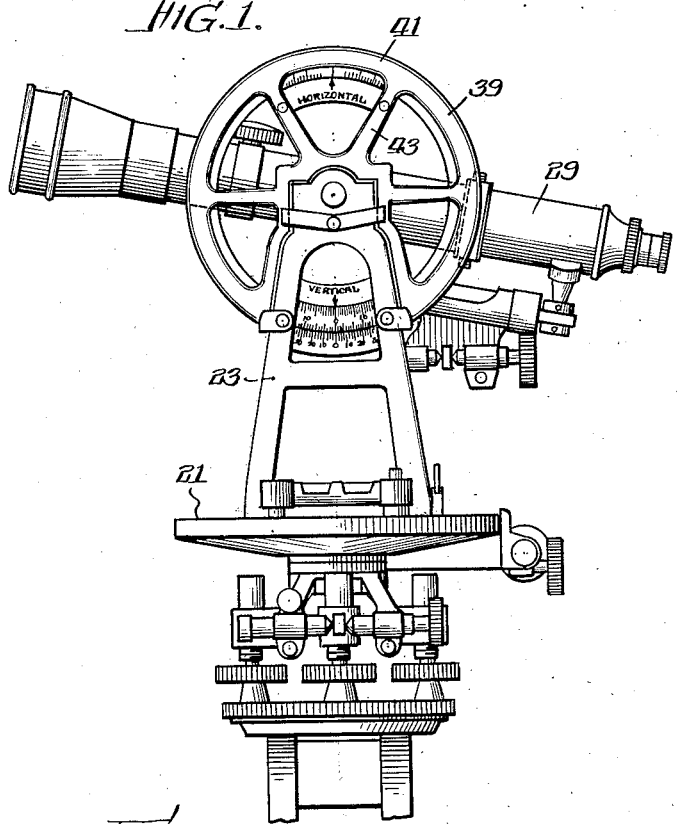
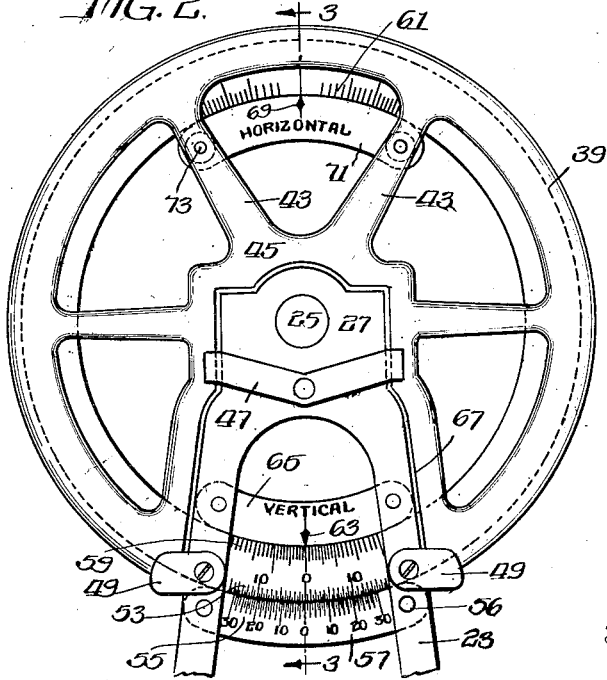
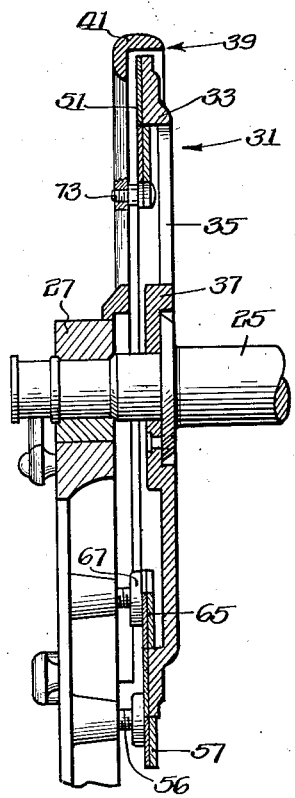
Inventor:
Adolph Langsner
By:- Cox & Moore
attys Sept. 8, 1936. A. LANGSNER 2,053,837
STADIA INSTRUMENT
Filed May 14, 1934 3 Sheets-Sheet 2
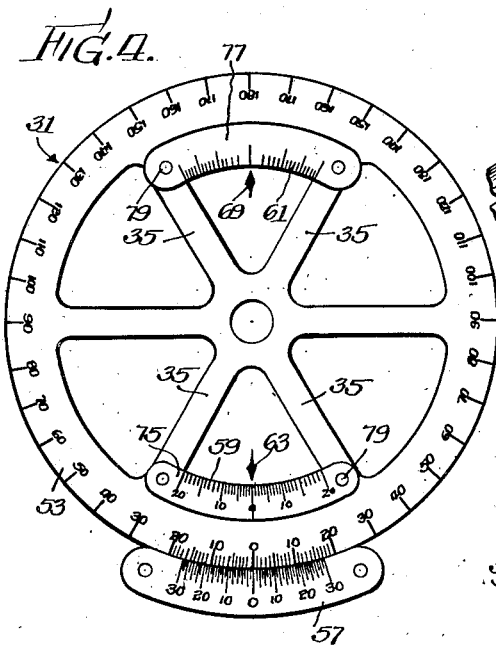
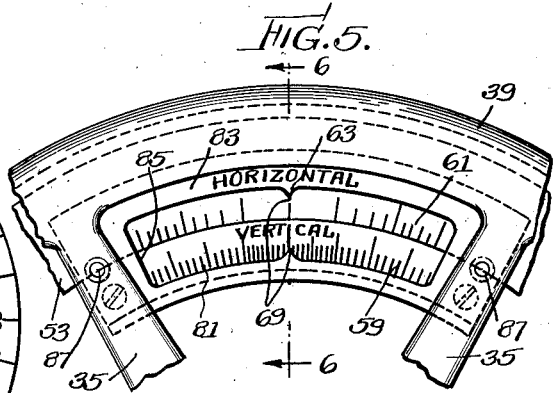
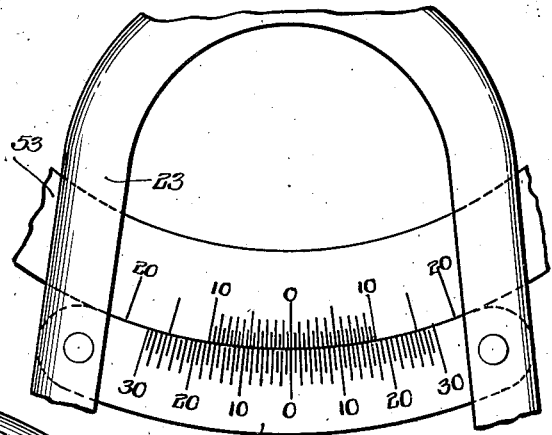
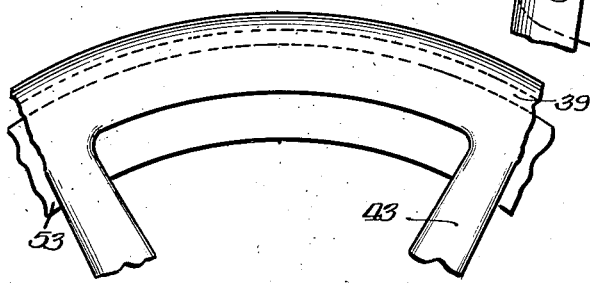
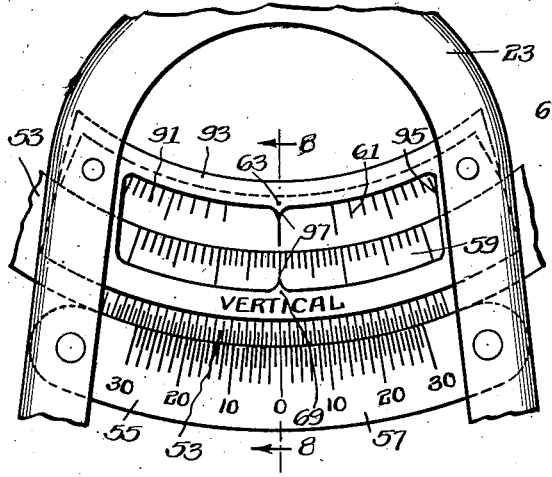
Inventor:
Adolph Langsner
By:- Cox & Moor attys.

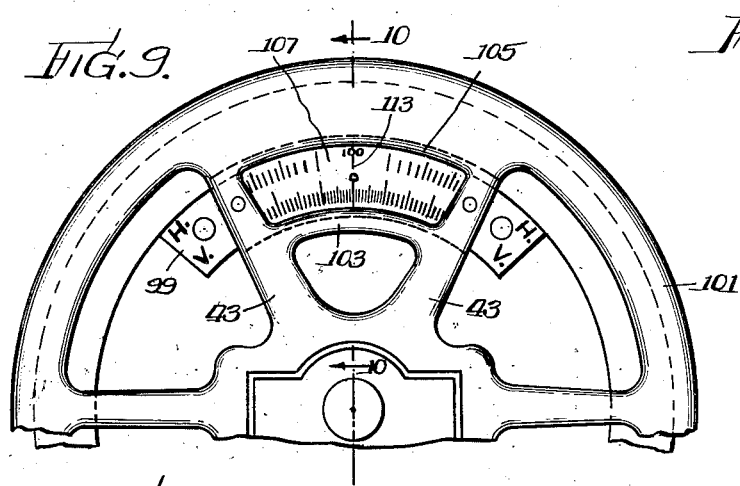
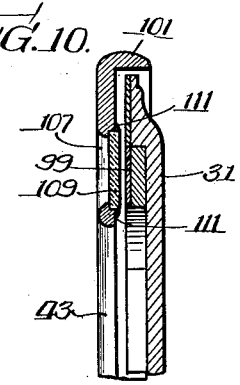
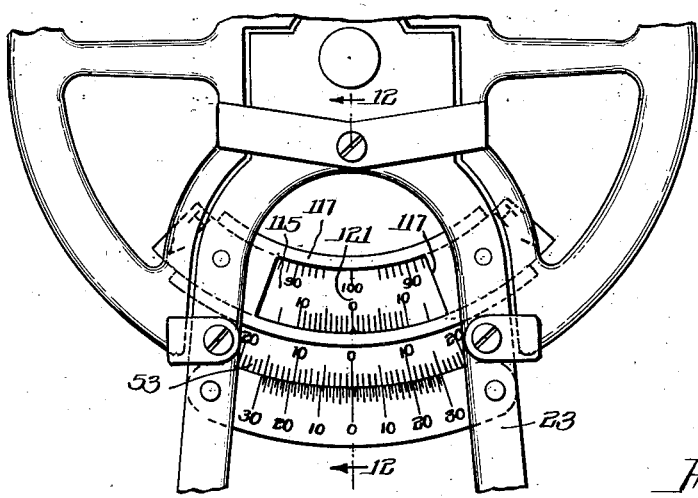
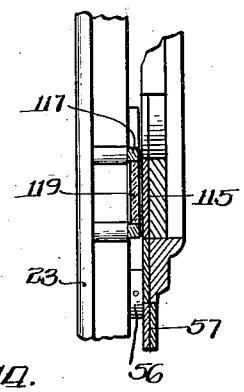
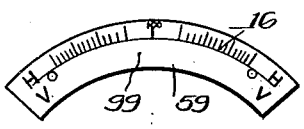
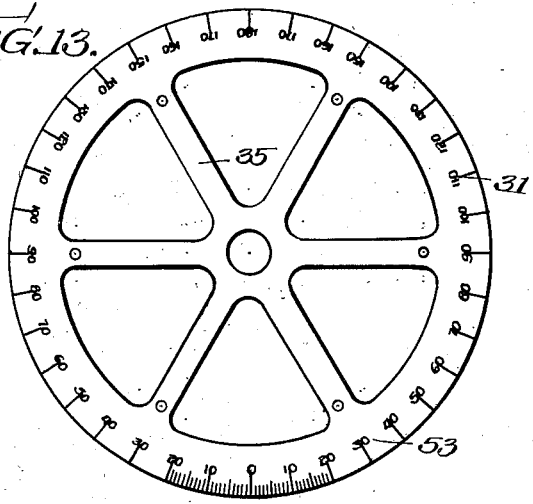
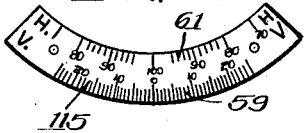

Patented Sept. 8, 1936

2,053,837

UNITED STATES PATENT OFFICE 2,053,837

STADIA INSTRUMENT

Adolph Langsner, Chicago, Ill., assignor to Eugene Dietzgen Company, Chicago, Ill., a corporation of Delaware Application May 14, 1934, Serial No. 725,494

20 Claims. (Cl. 33—71)

My invention relates in general to stadia instruments and has more particular reference to the provision of means in a stadia instrument for the direct determination of horizontal and vertical stadia constants.

An important object of the invention is to provide a stadia instrument having a plurality of scales, including scales of variable stadia constants, arranged relatively in readily observable position in the instrument, whereby observation of the several scales is facilitated.

Another important object is to provide a stadia instrument having a plurality of scales and co-operating index means wherein the scales are arranged in adjacent position in the instrument so that all may be observed at a glance, a further object being to arrange the scales so that the index marks are in alignment.

Another important object is to provide a stadia instrument having adjacently arranged scales of variable horizontal and vertical constants and common index means for said scales.

Another object is to provide a stadia instrument having adjacently arranged scales of variable horizontal and vertical constants and aligned index means for said scales.

Another object is to provide a stadia instrument having scales of variable horizontal and vertical stadia constants and co-operating index means, the scales being in parallel adjacent arrangement and the index means of the several scales being on a common hue whereby to permit the reading of the several scales substantially simultaneously.

Another important object is to arrange scales of vertical and horizontal stadia constants, in a stadia instrument, in vertically superposed relationship in the instrument in order to facilitate the reading of the same.

Another important object is to provide a stadia instrument having an angularity scale and scales of variable horizontal and vertical constants, and index means for said scales wherein the index means of at least one and preferably of both of the constant scales is aligned with the index means of the angularity scale.

Another object is to arrange a stadia instrument having an angularity scale movable on a standard and enclosed in a guard with a scale index on the standard and scales of vertical and horizontal constants movable with the angularity scale and having index means for one of the constant scales on the standard and index means for the other constant scales on the guard.

Another important object is to arrange, in a stadia instrument having an angularity scale, horizontal and vertical constant indicating scales in such position with respect to the angularity scale that the eye of an observer, reading the scales, may travel a continuous path whereby rapid observation of the several scales is facilitated; a further object being to arrange the angularity and constant scales in vertically superposed relationship so that the observer's eye may travel a straight vertical path from one to the other to thus facilitate observations.

Another important object is to provide means applicable to standard stadia instruments whereby the same may be provided with horizontal and vertical constant determining scales, in addition to the ordinary angularity scale forming a part of such instruments, without unduly increasing the cost of instruments provided with the additional constant determining scales.

Numerous other objects and advantages of the invention will be apparent from the following description, which, taken in connection with the accompanying drawings, discloses preferred embodiments of my invention.

Referring to the drawings:

Figure 1 is a side elevation of an instrument embodying my present invention;

Figure 2 is an enlarged view of a portion of the device illustrated in Figure 1;

Figure 3 is a sectional view taken substantially along the line 3—3 in Figure 2;

Figure 4 is a view of a stadia circle forming a part of the apparatus shown in Figure 1 and illustrating the several scales embodied in the instrument;

Figure 5 is a fragmentary view illustrating a modified arrangement of the transit;

Figure 6 is a sectional view taken substantially along the line 6—6 in Figure 5;

Figure 7 is a view similar to that shown in Figure 5 and illustrating another modified arrangement of the device;

Figure 8 is a sectional view taken along the line 8—8 in Figure 7;

Figure 9 is a fragmentary view of a modified form of the device illustrated in Figure 1;

Figure 10 is a sectional view taken substantially along the line 10—10 in Figure 9;

Figure 11 is a fragmentary view illustrating a still further modified arrangement of the device;

Figure 12 is a sectional view taken substantially along the line 12—12 in Figure 11; and Figures 13, 14, and 15 illustrate a stadia circle and associated scale segments utilized in the provision of the embodiments shown in Figures 9 and 11.

To illustrate my invention, I have shown on the drawings, a stadia instrument, namely a transit although the invention is not necessarily restricted to transits, but applies to any stadia instrument. The instrument shown comprises a support 21, having adjusting and leveling devices, such as are ordinarily provided with instruments of the character described. The support carries a frame comprising a pair of spaced-apart standards 23 preferably in the form of A members, at least one of which supports a frame portion forming a guard 39. The standards 23 are carried by the support 21 and in turn carry therebetween pivot means 25 journaled at its opposite ends in bearings 27 provided in the standards. The pivot means 25, in turn, carries a telescope 29, which is or may be provided with the usual stadia marks therein. The pivot means enables the telescope to be tilted to a desired angle as is well known in the art of surveying and since the telescope forms no part of the present invention, it is not thought necessary or desirable to describe the same in greater detail.

The pivot means, on one side of the telescope, carries a wheel 31 having an annular rim 33 and radial spokes 35. The wheel has a hub 37, by which it is secured for rotation with the pivot means on one side of the telescope adjacent the standard 23, which is provided with the guard 39 in position to encircle the wheel 31, said guard comprising a rim 41, within which the rim 33 of the wheel is adapted to rotate. The guard also has radial spokes 43 extending between the rim and centrally located means forming a seat 45 whereby the guard may be mounted upon the upper end of the A frame. The A frame is provided with fastening devices 47 and 49, by which the guard is secured to the frame on which it is mounted.

The side of the rim 33, facing the A frame, on which the guard is mounted, is formed with a scale-carrying surface 51 and the outer peripheral edge of this surface is provided with an angularity scale 53. The wheel 31 is so positioned that when the telescope 29 is tilted, the scale-provided edge 53 will sweep across a vernier scale 55 formed on the forwardly facing surface of a scale plate 57, which is mounted between the spaced legs of the A frame 23 as by suitably threaded fastening members 56 so that through the co-operation of the scales 53 and 55, the tilted angularity of the telescope may be determined at a glance.

I have also provided co-operating means formed in the guard or the frame 23 or both and on the wheel 31 by which vertical and horizontal stadia distance constants can be determined readily as a direct reading on the instrument after the same has been sighted and adjusted. In this connection, it should be understood that the telescope 29, as a part of its construction, is provided with horizontal cross-wires or hair lines so that when the observer sights the telescope upon a rod, the distance apparently subtended by the upper and lower hair lines may be read upon the rod. The distance so determined on the rod multiplied by a constant representing the spacement of the upper and lower hair lines in the telescope, gives the distance between the instrument and the rod, providing, of course, that the telescope is horizontal. If, however, it is necessary to incline the telescope to sight it upon the rod, it will be obvious that the apparent distance subtended on the rod between the upper and lower hair lines, multiplied by the constant previously referred to, will not give the true horizontal distance between the instrument and the rod. In order to determine the horizontal distance, it is necessary to make use of a trigonometrical formula involving the stadia distance and the cosine of the angle to which the telescope is tilted in sighting upon the rod. It is also possible to utilize a similar formula involving the stadia distance and the sine of the angle in order to determine the difference in elevation between the rod and the transit. These formulae may be arranged respectively as a vertical scale 59, and a horizontal scale 61 movable with the wheel 31 and having co-operating stationary marks arranged on the frame or guard to indicate on said scales the correct factor by which the stadia distance must be multiplied in order to give the true vertical and horizontal distances between the instrument and the rod. To this end, I form the vertical and horizontal scales on the inner peripheral edge of the scale surface 51, the horizontal and vertical scales being arranged in diametrically opposite relationship on the wheel rim 33 and one of said scales, preferably the vertical, being arranged in the surface 51 opposite the zero graduation of the angularity scale 53. An index mark 63 for the vertical scale so arranged is provided on an index plate 65, which is or may be mounted between the legs of the A frame 23 in any suitable fashion as by means of the threaded fastening members 67. An index mark 69, preferably formed on a plate 71 is provided for the horizontal scale. The plate 71 is preferably supported on the guard 39, the opposite ends of the plate 71 being fastened to the upwardly extending arms 43 of the guard as by means of the threaded fastening members 73. The index plate 71 is thus carried by and between the arms 43 with the index mark 69 in position to indicate a graduation of the horizontal scale 61. It will be noted that the vertical and horizontal scales 59 and 61 and their associated index marks 63 and 69 are in vertically superposed relationship with respect to each other and also with respect to the angularity scale 53. After the telescope has been sighted upon the rod, the indicated reading on the several scales 53, 59, and 61 may be determined at a glance, it being necessary simply that the eye of the observer travel vertically upwardly along the center line of the guard, it being unnecessary even to change position in reading the several scales, thus the operation of the device is facilitated so readings may be accomplished more quickly and with less effort to the end that the utility of the device is greatly increased.

It will be noted also that the vertical and horizontal scales 59 and 61 and their co-operating indices 63 and 69 are provided in the transit without materially altering the structure of the same, it being merely necessary to provide the scales 59 and 61 on the inner edge of a standard wheel and apply the index plates 65 and 71 respectively to the frame 23 and the guard 39, which may be accomplished by merely drilling the upwardly extending arms 43 to receive the fastening members 73 and without otherwise altering or providing a special guard. It is also a simple matter to attach the index plate 65 between the spaced legs of the frame 23. It is not even necessary to inscribe the scales 59 and 61 upon the surface 51, but the same may be formed upon plates 75 and 77 adapted for attachment between the adjacent legs 35 of the wheel 31 near its rim 33 as indicated in Figure 4, the plates 75 and 77 being attached in any suitable fashion as by fastening members 79 threaded into perforations formed in the legs 35. The index marks 63 and 69 are formed in any suitable fashion as on plates similar to the plates 65 and 71, which are mounted between the legs of the frame 23 and the arms 45 of the guard in position to register with the scales 59 and 61. Alternately, the index 63 and index 69 in the embodiments shown in Figures 1 through 4 may take the form illustrated in Figures 5 through 8, in which the indices are arranged in the form of projections in a window plate carried by the frame 23 and the guard 39 in position to overlie the scales 61 and 63 and expose the same through the window of the plate. The indices 63 and 69 also, if desired, may be arranged, as shown in Figures 9 through 12, in the form of hair lines on a plate of translucent material, such as glass, which is fitted into the frame 23 or the guard 39 in position to overlie the scales 59 and 61 and form a window through which the same are visible with the hair lines overlying said scales.

In Figures 5 and 6, I have illustrated an arrangement in which the vertical and horizontal scales 59 and 61 are both arranged in position visible at the top of the wheel in diametrically opposite relationship with respect to the angularity scales 53 and 55, since it may, in some cases, be more convenient to have the vertical and horizontal scales close together instead of on opposite sides of the wheel as in the forms shown in Figures 1 through 4.

In the embodiment shown in Figures 5 and 6, the horizontal scale 61 is inscribed upon the inner edge of the scale surface 51 in a diametrically opposite relationship with respect to the normal zero mark of the scale 53. The vertical scale 59, however, is inscribed upon a sectional plate 81, which may be similar in form to the plate 75 of the embodiment illustrated in Figure 4 and which is attached between the arms 35 of the wheel 31 adjacent the inner edge of the scale surface 51, on which the horizontal scale 61 is inscribed, the segmental plate 81 being secured in position in a manner similar to that employed in securing the segmental plate 77 in position in the arrangement shown in Figure 4. I also prefer to utilize a window plate 83 having an operture 85 and secured between the adjacent upwardly extending arms 43 of the guard 39 in order to frame and attract attention to the vertical and horizontal scales 59 and 61, the window plate 83 may be formed as a sheet metal stamping if desired and is secured in place by suitable fastening devices 87 so as to expose the scales 59 and 61 in the opening 85. The upper and lower edges of the plate, defining the opening 85, are also preferably formed with projections 89 in position to register with the graduations of the scales 59 and 61 and these projections form the indices 63 and 69. If desired, the projections 89 may be omitted and the plate 83 fitted with a sheet of transparent material, such as glass, on which hair lines may be formed in position overlying the scales for the purpose of affording the index marks 63 and 69.

In Figures 7 and 8, I have illustrated an arrangement in which the vertical and horizontal scales 59 and 61 are arranged in position to be viewed on the lower side of the wheel 31 adjacent the angularity scales 53 and 55, since this arrangement permits of three scales to be viewed with the least possible effort. To this end, I inscribe the vertical scale 59 on the inner edge of the scale surface 51 with its zero mark in registration with the zero graduation of the scale 53, while the horizontal scale 61 is formed upon a segmental plate 91, which is secured between adjacent legs 35 of the wheel in position such that the horizontal scale 61 registers with the vertical scale 59. The segmental plate 91 may be similar in form to the plate 77 of the embodiment illustrated in Figure 4 and may be secured in position in a manner similar to that employed in securing the plate 75 between the spokes of the wheel in said embodiment. A window plate 93, similar to the plate 83 and having an aperture 95, is provided in position to frame the scales 59 and 61 in said aperture, is mounted between the legs of the A frame in position to overlie the scales, the plate being held in position by the threaded fastening devices 67. The upper and lower edges, defining the aperture 95, may also be provided with projections 97 in position to define the indices 63 and 69, or the plate 93 may be provided with a glass window inscribed with hair lines forming the indices in a manner similar to that described in the embodiment shown in Figure 5.

It will be noted that the forms shown in Figures 5 and 7 may be fabricated by adding to standard transit parts, the segmental plates 81 or 91 as the case may be and by providing the window plates 83 or 93 and by inscribing the scale 61 or 59 in proper position upon the scale surface 51. Consequently, a transit having vertical and horizontal scales may be provided at minimum expense.

In Figures 9 through 15, I have disclosed the possibility of providing vertical and horizontal scales in a standard transit without the necessity of inscribing these additional scales upon the scale surface 51 of the transit wheel. I may arrange the vertical and horizontal scales either at the top or at the bottom of the transit wheel. Where the scales are applied at the top of the wheel, I provide a segmental plate 99 having vertical and horizontal scales 59 and 61 inscribed on its opposite curved edges. This plate is mounted between the upwardly extending arms 35 of the transit wheel 31 preferably in a manner similar to that employed in mounting the plate 77 in Figure 4 and the plate 81 in Figure 5. The plate is thus mounted on the wheel in diametrically opposite relationship with respect to the zero graduation of the angular scale 53. This arrangement is illustrated in Figures 9 and 10 of the drawings. If desired, a guard 39 may be used, the guard being provided with a window plate similar to the plate 83 of the embodiment shown in Figure 5. However, I prefer to provide a special guard 101 formed with a cross piece 103 between the upwardly extending legs 43 of the guard so that the space, between the crosspiece 103 and the edge 105 of the guard rim between the legs 43, defines a window 107 framing the scales 59 and 61 carried on the segmental plate 99. The guard also may be provided with a preferably glass plate 109 secured in the opening 107 in any suitable fashion as by means of cement 111, and the plate 109 is provided with a hair line 113 in position overlying the scales 59 and 61 and adapted to provide index means 63 and 69.

Alternately, as shown in Figures 11 and 12, vertical and horizontal scales 59 and 61 may be formed on opposite edges of a segmental plate adapted to be mounted on the lower side of the transit wheel in registration with the angularity scale 53, the plate 115 being mounted in a manner similar to that employed in mounting the plates 75 in Figure 4 and 91 in Figure 7. With this arrangement, a window plate, similar to the plate 83, shown in Figure 7, may be provided but I prefer to employ a frame 117 having a preferably glass window 119 overlying the segmental plate 115 and provided with a hair line 121 adapted to provide the index means 63 and 99.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages; the forms herein described being preferred embodiments for the purpose of illustrating my invention.

Having thus described my invention, what I claim as new and desire to secure by Letters Patent is as follows:

1. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in vertical alignment with respect to said angularity index means.

2. In a stadia instrument, the combination with a frame having spaced legs, a telescope provided with stadia wires and mounted for angular adjustment with respect to the frame, means movable with said telescope and carrying an angularity scale in position exposed between the legs of said frame, and angularity index means carried by said frame for indicating, on the portions of said angularity scale exposed between said legs, the angular position of said telescope with respect to the frame, of means forming an additional scale movable with said telescope in position exposed between the legs of said frame and graduated in terms of stadia constants varying with the angle of inclination of said telescope, and index means for said additional scale supported by said frame in position to co-operate with a portion of said additional scale exposed between the legs of said frame.

3. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means for said additional scales, stationarily supported by said frame.

4. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein said additional scale is formed on a separate segmental plate attached to the angularity scale-carrying member.

5. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein said additional scale is formed on a separate segmental plate attached to the angularity scale-carrying member adjacent an edge of its arcuate portion.

6. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein said additional scale is formed on a separate segmental plate attached to the angularity scale-carrying member adjacent the inner edge of its arcuate portion.

7. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the index means for said additional scale is formed on a separate index plate stationarily supported by the frame.

8. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the index means for said additional scale comprises an element having a window and fixed on the frame in position overlying said additional scale and exposing the same through said window.

9. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the index means for said additional scale comprises a transparent plate having an index mark thereon and supported by the frame in position overlying said additional scales.

10. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the angularity scale is formed in the outer edge and the additional scale is formed on the inner edge of said arcuate portion with its neutral graduation in alignment with the zero graduation of the angularity scale.

11. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the angularity scale and the additional scale are formed in opposed edges of said arcuate portion and the index means for the scales are carried on separate members stationarily mounted on the frame on opposite sides of said arcuate scale-carrying portion.

12. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position to indicate, on said angularity scale, the angular position of said telescope with respect to the frame, of means forming an additional scale movable with said telescope and graduated in terms of stadia constants varying with the angle of inclination of said telescope, and index means for said additional scale stationarily supported by said frame in alignment with respect to said angularity index means, wherein the arcuate portion of the member comprises an annular surface with the angularity scale formed on one circular edge of said surface and the additional scale formed on the opposite circular edge of said surface, the neutral graduation of the additional scale being located in diametral opposition on said annular surface with respect to the zero graduation of the angularity scale.

13. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein said additional scales are formed on a separate segmental plate attached to the angularity scale-carrying member.

14. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein the angularity scale and one of said additional scales are formed in opposed edges of said arcuate portion while another of said additional scales is formed on a separate segmental plate attached to the angularity scale-carrying member.

15. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein the arcuate portion of the member comprises an annular surface with the angularity scale formed thereon and wherein said additional scales are formed on a separate segmental plate attached to the angularity scale-carrying member with the neutral graduations of said additional scales lying in a plane including the zero graduation of the angularity scale and the axis about which said scale-carrying member is mounted for rotation in the frame.

16. In a stadia instrument, the combination with a frame, a telescope provided with stadia wires and mounted for angular adjustment with respect to the frame, a member movable with said telescope and having an arcuate portion carrying an angularity scale and angularity index means supported by said frame in position centrally aligned vertically with respect to the axis of angular adjustment of the telescope, said angularity index cooperating in the angular scale to indicate the angular position of the telescope with respect to the frame, of members forming an additional scale movable with said telescope and graduated in terms of vertical stadia constants varying with the angle of inclination of the telescope, index means cooperatingly associated with said additional scale and stationarily supported by said frame in vertical alignment with respect to the axis of adjustment of the telescope, means forming another scale movable with said telescope and graduated in terms of horizontal stadia constants varying with the angle of inclination of said telescope and cooperating index means for said other scale and stationarily supported by said frame in vertical alignment with respect to the axis of adjustment of said telescope whereby the several index means are vertically aligned in said frame in order to facilitate reading of the several scales without changing the position of the observer.

17. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein said additional scales are formed on a separate segmental plate attached to the angularity scale carrying member adjacent the inner edge of its arcuate portion.

18. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein the angularity scale carrying member comprises an annular element and wherein the means forming the additional scales is arranged on said circle in position such that the neutral graduations of the additional scales are displaced angularly on the circle with respect to the neutral graduation of the angularity scale.

19. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein the index means for said additional scales is formed on a separate index plate stationarily supported by the frame.

20. In a stadia instrument, the combination with a frame, a telescope provided with stadia wires and mounted for angular adjustment with respect to the frame, a member movable with said telescope and having an arcuate portion carrying an angularity scale, and angularity index means supported by said frame in position to indicate, on said angularity scale, the angular position of said telescope with respect to the frame, of means forming additional scales, movable with said telescope and graduated respectively in terms of vertical and horizontal stadia constants varying with the angle of inclination of said telescope, said scales being arranged in parallel adjacent relationship and aligned index means, for said additional scales, stationarily supported by said frame, wherein the index means for said additional scales comprises means fixed on the frame and forming a window in position overlying said additional scales and exposing the same in the window including index means in said window in position to cooperate with said additional scales.

ADOLPH LANGSNER.